United States Patent
Park et al.

(10) Patent No.: US 11,268,613 B2
(45) Date of Patent: *Mar. 8, 2022

(54) APPARATUS AND METHOD FOR CONTROLLING TRANSMISSION OF VEHICLE

(71) Applicants: Hyundai Motor Company, Seoul (KR); Kia Motors Corporation, Seoul (KR)

(72) Inventors: Kwang Hee Park, Suwon-Si (KR); Byeong Wook Jeon, Seoul (KR); Dong Hoon Jeong, Hwaseong-si (KR); Jae Chang Kook, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/073,770

(22) Filed: Oct. 19, 2020

(65) Prior Publication Data
US 2021/0372519 A1 Dec. 2, 2021

(30) Foreign Application Priority Data

May 27, 2020 (KR) .................. 10-2020-0063809

(51) Int. Cl.
*F16H 59/66* (2006.01)
*F16H 59/44* (2006.01)
(Continued)

(52) U.S. Cl.
CPC ............ *F16H 59/66* (2013.01); *F16H 59/44* (2013.01); *F16H 59/48* (2013.01); *F16H 59/68* (2013.01);
(Continued)

(58) Field of Classification Search
CPC .......... F16H 59/44; F16H 59/48; F16H 59/66; F16H 59/68; F16H 2059/663;
(Continued)

(56) References Cited

U.S. PATENT DOCUMENTS 5,716,301 A * 2/1998 Wild ...................... G01C 21/26
477/97
9,297,455 B2 * 3/2016 Li ........................... F16H 61/00
(Continued)

FOREIGN PATENT DOCUMENTS

KR 2020-0114736 A 10/2020

*Primary Examiner* — Edwin A Young
(74) *Attorney, Agent, or Firm* — Morgan, Lewis & Bockius LLP

(57) ABSTRACT

An apparatus and a method for controlling a transmission of a vehicle may include a determining device configured to determine whether a curved road is present within a predetermined distance in front of the vehicle, based on information on a front road, a calculating device configured to correct, based on information on a gradient of the curved road, a vehicle speed in starting cornering of the vehicle on the curved road, determine an expected lateral acceleration based on the corrected vehicle speed and information on a curvature of the curved road, and determine a pattern correcting coefficient based on the determined expected lateral acceleration, a pattern correcting device configured to correct a gearshifting pattern of the transmission, which is preset, based on the pattern correcting coefficient, and a control device connected to the determining device, the calculating device and the pattern correcting device and configured to control the transmission based on the corrected gearshifting pattern when the vehicle enters the curved road.

20 Claims, 12 Drawing Sheets

(51) Int. Cl.
  *F16H 59/68*   (2006.01)
  *F16H 59/48*   (2006.01)
  *F16H 61/02*   (2006.01)
  *F16H 61/00*   (2006.01)

(52) U.S. Cl.
  CPC ... *F16H 61/0213* (2013.01); *F16H 2059/663* (2013.01); *F16H 2059/6807* (2013.01); *F16H 2061/0087* (2013.01); *F16H 2061/0223* (2013.01)

(58) Field of Classification Search
  CPC ....... F16H 2059/666; F16H 2059/6807; F16H 61/0213; F16H 61/16; F16H 2061/0087; F16H 2061/0223; F16H 2061/0227; F16H 2061/0234; F16H 2061/009; F16H 2061/0093; F16H 2061/022; F16H 2061/163
  See application file for complete search history.

(56) References Cited

U.S. PATENT DOCUMENTS

| | | | |
|---|---|---|---|
| 10,948,075 B2* | 3/2021 | Park | F16H 61/0213 |
| 2010/0030437 A1* | 2/2010 | Kim | F16H 61/0213 |
| | | | 701/65 |
| 2010/0041512 A1* | 2/2010 | Silveri | B60K 6/52 |
| | | | 477/3 |
| 2010/0100293 A1* | 4/2010 | Takanami | F16H 61/0213 |
| | | | 701/65 |
| 2019/0263368 A1* | 8/2019 | Takahashi | B60T 8/171 |

* cited by examiner ical embodiments of the present invention pertains.

APPARATUS AND METHOD FOR CONTROLLING TRANSMISSION OF VEHICLE

CROSS-REFERENCE TO RELATED APPLICATION

The present application claims priority to Korean Patent Application No. 10-2020-0063809, filed on May 27, 2020, the entire contents of which is incorporated herein for all purposes by this reference.

BACKGROUND OF THE INVENTION

Field of the Invention

The present invention relates to an apparatus and a method for controlling a transmission of a vehicle, and more particularly to a technology of expecting a lateral acceleration based on a gradient of a curved road.

Description of Related Art

An automatic transmission is a device to automatically control a gearshifting stage depending on a driving situation and the acceleration intention of a driver, improving the convenience of a driver.

A conventional automatic transmission controls a gearshifting stage based on a gearshifting pattern determined depending on a vehicle speed and an open amount of an accelerator pedal.

As described above, the conventional automatic transmission fails to reflect various road conditions and driving situations because a gearshifting stage is determined depending on the vehicle speed and the open amount of the accelerator pedal.

For example, the gearshifting pattern determined in straight line driving is identically applied to even the driving of the curved road.

As described above, when an existing gearshifting pattern is reflected in the driving on the curved road, as gear shifting is performed in accelerator OFF and upshift to a higher stage occurs, a driver may increasingly feel disharmony.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an apparatus and a method for controlling a transmission of a vehicle, configured for correcting a gearshifting pattern depending on an expected lateral acceleration based on a vehicle speed, a curvature of a curved road, and a gradient of the curved road when the curved road is present in front of the vehicle, not only stably performing driving on the curved road, but also improving an engine brake effect and re-acceleration response.

The technical problems to be solved as various exemplary embodiments of the present invention are not limited to the aforementioned problems, and any other technical problems not mentioned herein will be clearly understood from the following description by those skilled in the art to which various exemplary embodiments of the present invention pertains.

According to various aspects of the present invention, an apparatus of controlling a transmission of a vehicle, may include a determining device configured to determine whether a curved road is present within a specific distance in front of the vehicle, based on information on a front road, a calculating device configured to correct, based on information on a gradient of the curved road, a vehicle speed in starting cornering of the vehicle on the curved road, determine an expected lateral acceleration based on the corrected vehicle speed and information on a curvature of the curved road, and determine a pattern correcting coefficient based on the determined expected lateral acceleration, a pattern correcting device configured to correct a gearshifting pattern of the transmission, which is preset, based on the pattern correcting coefficient, and a control device connected to the determining device, the calculating device and the pattern correcting device and configured to control the transmission based on the corrected gearshifting pattern when the vehicle enters the curved road.

According to various exemplary embodiments of the present invention, the determining device may determine whether the curved road satisfies an effective curved road condition, based on a distance of a section of the curved road and the information on the curvature of the curved road.

According to various exemplary embodiments of the present invention, the determining device may determine whether the vehicle arrives at an expected gearshifting point before the vehicle arrives at a start point of the curved road, when the curved road satisfies the effective curved road condition.

According to various exemplary embodiments of the present invention, the expected gearshifting point may be positioned in a specific time before arriving at the start point of the curved road.

According to various exemplary embodiments of the present invention, the determining device may determine a speed correcting coefficient learned depending on an extent of the gradient of the curved road.

According to various exemplary embodiments of the present invention, the determining device may determine a speed at a start point of the curved road based on the vehicle speed and the speed determining coefficient at an expected gearshifting point, when the vehicle arrives at the expected gearshifting point.

According to various exemplary embodiments of the present invention, the determining device may determine the expected lateral acceleration based on the speed at the start point of the curved road and the curvature of the curved road.

According to various exemplary embodiments of the present invention, the determining device may determine the pattern correcting coefficient based on a differential value between the determined expected lateral acceleration and a lower limit reference value of a lateral acceleration, and a differential value between the lower limit reference value of the lateral acceleration and an upper limit reference value of the lateral acceleration.

According to various exemplary embodiments of the present invention, the pattern correcting coefficient may be defined as a value in '0' and '1'.

According to various exemplary embodiments of the present invention, the gearshifting pattern may be determined as a first gearshifting pattern based on a normal mode when the pattern correcting coefficient is '0', determined as a second gearshifting pattern based on a sport mode when the pattern correcting coefficient is '1', and determined as a third gearshifting pattern based on a curved road when the pattern correcting coefficient is greater than '0' and less than '1'.

According to various exemplary embodiments of the present invention, the pattern correcting device may shift, based on the first gearshifting pattern, the gearshifting pattern by a value, which is obtained by multiplying a differential value between the second gearshifting pattern and the first gearshifting pattern by the pattern correcting coefficient, when the gearshifting pattern is determined as being the third gearshifting pattern.

According to various exemplary embodiments of the present invention, the control device may return the corrected gearshifting pattern to a previous gearshifting pattern, when the vehicle passes through the curved road.

According to various exemplary embodiments of the present invention, the determining device may determine whether a continuous curved road is present on the front road, when the vehicle passes through the curved road.

According to various exemplary embodiments of the present invention, the determining device may determine the continuous curved road as being present on the front road, when a next curved road is present on the front road within a reference distance after the vehicle passes through the curved road, and when a vehicle speed of the vehicle is equal to or greater than a reference vehicle speed.

According to various exemplary embodiments of the present invention, the control device may maintain the corrected gearshifting pattern when the continuous curved road is determined as being present on the front road.

According to various exemplary embodiments of the present invention, the control device may return the corrected gearshifting pattern to a previous gearshifting pattern when the continuous curved road is determined as being absent on the front road.

According to various aspects of the present invention, a method for controlling a transmission of a vehicle, may include determining whether a curved road is present within a specific distance in front of the vehicle, based on information on a front road, determining a vehicle speed in starting cornering on the curved road, based on information on a gradient of the curved road, determining an expected lateral acceleration based on the vehicle speed and information on a curvature of the curved road to determine a pattern correcting coefficient based on the determined expected lateral acceleration, correcting a gearshifting pattern of the transmission, which is preset, based on the pattern correcting coefficient, and controlling the transmission based on the corrected gearshifting pattern when the vehicle enters the curved road.

According to various exemplary embodiments of the present invention, the determining of whether the curved road is present may include determining whether the curved road satisfies an effective curved road condition, based on a section distance of the curved road and information on the curvature of the curved road, and determining whether the vehicle arrives at an expected gearshifting point before the vehicle arrives at a start point of the curved road, when the curved road satisfies the effective curved road condition.

According to various exemplary embodiments of the present invention, the determining of the expected lateral acceleration may include determining a speed correcting coefficient learned depending on a gradient of the curved road, and determining a speed of the vehicle at the start point of the curved road based on a vehicle speed at the expected gearshifting point and the speed correcting coefficient, when the vehicle arrives at the expected gearshifting point before the vehicle arrives the start point of the curved road.

According to various exemplary embodiments of the present invention, the determining of the expected lateral acceleration may further include determining the expected lateral acceleration based on the speed at the start point of the curved road and the curvature of the curved road.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
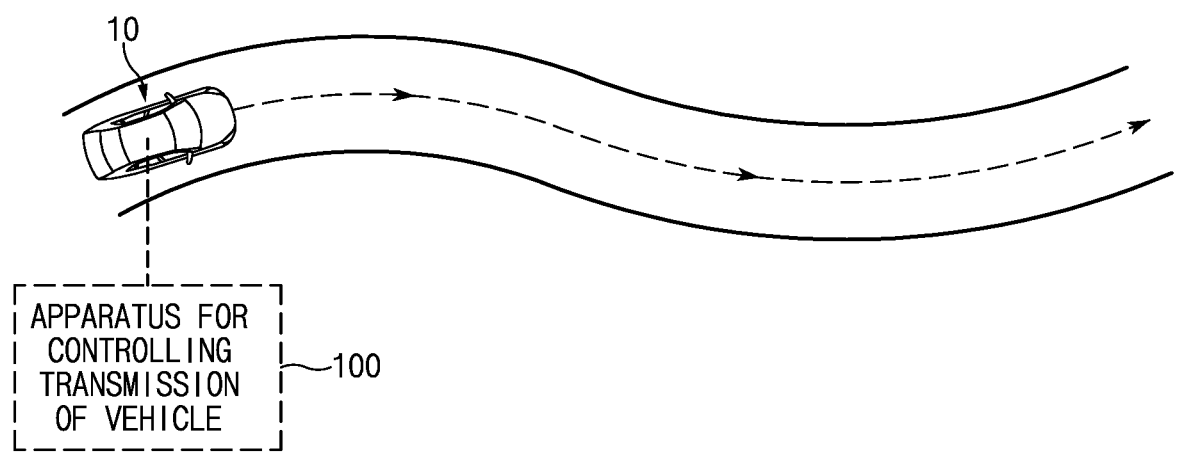
FIG. 1 is a view exemplarily illustrating a vehicle to which an apparatus of controlling a transmission of a vehicle is applied, according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to accompanying drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined in the present application.

According to various exemplary embodiments of the present invention, an apparatus and a method for controlling a transmission of a vehicle relate to a technology of automatically controlling the transmission while driving. The vehicle applied to the present invention may include various vehicles as long as the vehicles are implemented with an automatic transmission function.

FIG. 1 is a view exemplarily illustrating a vehicle to which an apparatus of controlling a transmission of a vehicle is applied.

Referring to FIG. 1, an apparatus 100 for controlling a transmission of a vehicle 10 may control the transmission based on a gearshifting pattern determined during the driving of the vehicle 10. In the instant case, the apparatus 100 for controlling the transmission of the vehicle may obtain information on a front road from one or more sensors and/or navigation systems during the driving, and may determine the gearshifting pattern based on a road condition and/or a driving situation which are obtained. Accordingly, according to various exemplary embodiments of the present invention, the apparatus 100 for controlling the transmission of the vehicle may improve the forward driving stability and may allow the driver to naturally feel gear shifting.

Accordingly, the detailed configuration and operation of the apparatus 100 for controlling the transmission of the vehicle will be described in detail with reference to FIG. 2.

According to various exemplary embodiments of the present invention, the apparatus 100 for controlling the transmission of the vehicle may be implemented inside the vehicle. In the instant case, the apparatus 100 for controlling the transmission of the vehicle may be formed integrally with internal controllers of the vehicle 10. Meanwhile, the apparatus 100 for controlling the transmission of the vehicle may be implemented in a form of a separate device and may be connected to the controllers of the vehicle 10 through a separate connecting portion. The apparatus 100 for controlling the transmission of the vehicle may be formed integrally with the internal controllers of the vehicle or may be implemented separately from the internal controllers of the vehicle to be connected to the internal controllers of the vehicle through a separate connector.

Figure 2:
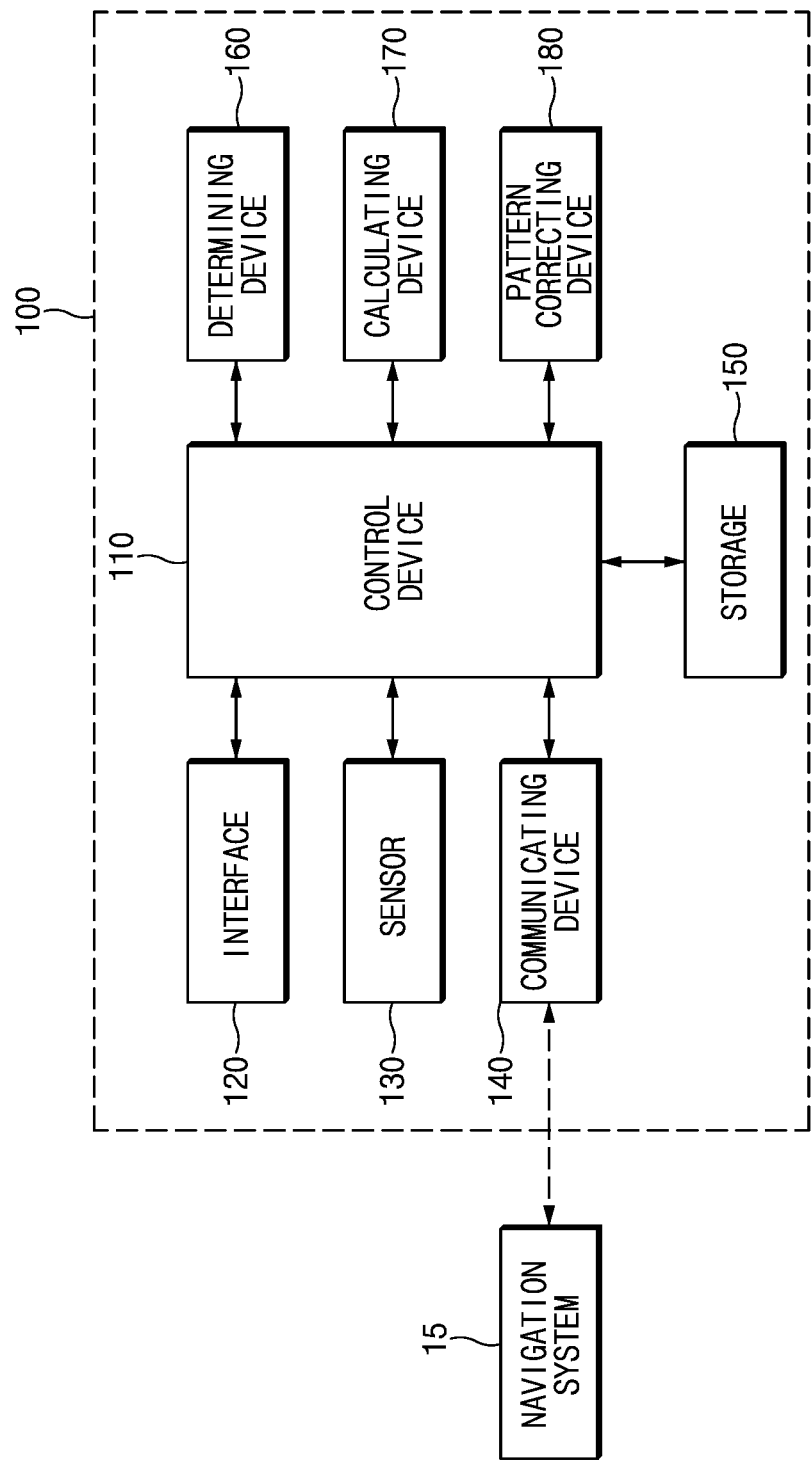
FIG. 2 is a view exemplarily illustrating the configuration of a vehicle to which an apparatus of controlling a transmission of a vehicle is applied, according to various exemplary embodiments of the present invention.

FIG. 2 is a view exemplarily illustrating the configuration of an apparatus of controlling the transmission of the vehicle, according to various exemplary embodiments of the present invention.

Referring to FIG. 2, the apparatus 100 may include a control device 110, an interface 120, a sensor 130, a communicating device 140, a storage 150, a determining device 160, a calculating device 170, and a pattern correcting device 180. In the instant case, according to the exemplary embodiment of the present invention, the control device 110, the determining device 160, the calculating device 170, and the pattern correcting device 180 in the apparatus 100 for controlling the transmission of the vehicle may be implemented with at least one processor.

The interface 120 may include an input device to receive a control command from a user and an output device to output the operation state and the operation result of the apparatus 100 for controlling the transmission of the vehicle.

In the instant case, the input device may include a key button, and may include a mouse, a joystick, a jog shuttle, a stylus pen, or the like. Furthermore, the input device may include a soft key implemented on a display.

The output device may include a display and may include a voice output device such as a speaker. In the case that a touch sensor, such as a touch film, a touch sheet, or a touch pad, is mounted in the display, the display may operate as a touch screen, and the input device and the output device may be implemented in the integral form.

In the instant case, the display may include at least one of a liquid crystal display (LCD), a thin film transistor-liquid crystal display (TFT LCD), an organic light-emitting diode (OLED), a flexible display, a field emission display (FED), or a three dimensional display (3D display).

The sensor 130 may include at least one sensor to detect road information around the vehicle 10. For example, the sensor 130 may include a global positioning system (GPS) sensor to detect whether a curved road is present in front of the vehicle, or information on the curvature of the front curved road, or information on a gradient of the curved road.

Furthermore, the sensor 130 may further include a sensor to measure the speed of the vehicle 10 and/or an accelerator pedal sensor (APS).

The communicating device 140 may include a communicator for communicating with electronic parts and/or controllers provided in the vehicle. The communicator may communicate to the navigation system 15 provided in the vehicle 10 to receive, from the navigation system 15, the information on the front road. For example, the communicator may receive information on a position of the front road, a distance of a section of the curved road, the curvature of the curved road, and the gradient of the curved road.

Furthermore, the communicator may receive driving data (e.g., speed, acceleration, or APS) of the vehicle 10 from the sensors provided in the vehicle 10. In the instant case, the vehicle network communication technology may include a controller area network (CAN) communication technology, a local interconnect network (LIN) communication technology, a FlexRay communication technology.

Furthermore, the communicating device 140 may further include a communicator to support wireless Internet access or a communicator to support short range communication. In the instant case, the wireless Internet technology may include a wireless LAN (WLAN), a wireless broadband (Wibro), a Wi-Fi, Worldwide Interoperability for Microwave Access (WiMAX). The short range communication technology may include Bluetooth, ZigBee, ultra-wideband (UWB), radio frequency identification (RFID), or infrared data association (IrDA).

The storage 150 may store data or algorithms necessary for the apparatus 100 for controlling the transmission of the vehicle to operate.

For example, the storage 150 may store information (e.g., information related to the curvature or gradient of the curved road) on the front road, which is obtained through the navigation system 15 or the sensor 130, and may store driving data, which is obtained during the driving, of the vehicle 10. Furthermore, the storage 150 may store a learning algorithm for learning a speed correcting coefficient based on the information on the gradient of the curved road, and may store the speed correcting coefficient learned based on the gradient of the curved road. Furthermore, the storage 150 may store the gearshifting pattern depending on a vehicle state and/or a road condition. Furthermore, the storage 150 may store condition information applied to determine the gearshifting pattern.

The storage 150 may store one or more instructions and/or algorithms to determine an expected lateral acceleration based on the vehicle speed of the vehicle 10, and the curvature and gradient of the curved road, determine a pattern correcting coefficient, and correct the gearshifting pattern based on the pattern correcting coefficient. Furthermore, the storage 150 may store an instruction or algorithm to control the transmission of the vehicle 10 during the driving depending on the gearshifting pattern.

In the instant case, the storage 150 may include a storage medium, such as a random access memory (RAM), a static random access memory (SRAM), a read only memory (ROM), a programmable read-only memory (PROM), an electrically erasable programmable read-memory, or the like.

The determining device 160 determines whether a curved road is present within a specific distance, based on information on the front road, which is obtained from the navigation system 15 and/or the sensor 130. Furthermore, the determining device 160 may determine whether the curved road satisfies an effective curved road condition, based on the distance of the section and the information on the curvature of the curved road, when the front road is present in the specific distance in front.

In the instant case, the determining device 160 may determine whether the vehicle 10 arrives at a first point in a first time before arriving at a start point of the curved road, whether the vehicle 10 arrives at a second point in a second time before arriving at the start point of the curved road, whether the vehicle 10 arrives at a third point in a third time before arriving at the start point of the curved road, and whether the vehicle 10 arrives at a fourth point in a fourth time before arriving at the start point of the curved road, when viewed based on the start point of the curved road of the vehicle 10. In the instant case, the second time is shorter than the first time and longer than the third time. Furthermore, the first point is a point positioned farthest away from the start point of the curved road, the second point is a point between the first point and the third point, and the third point is a point between the second point and the fourth point. The exemplary embodiment relevant thereto will be described with reference to FIG. 3.

Figure 3:
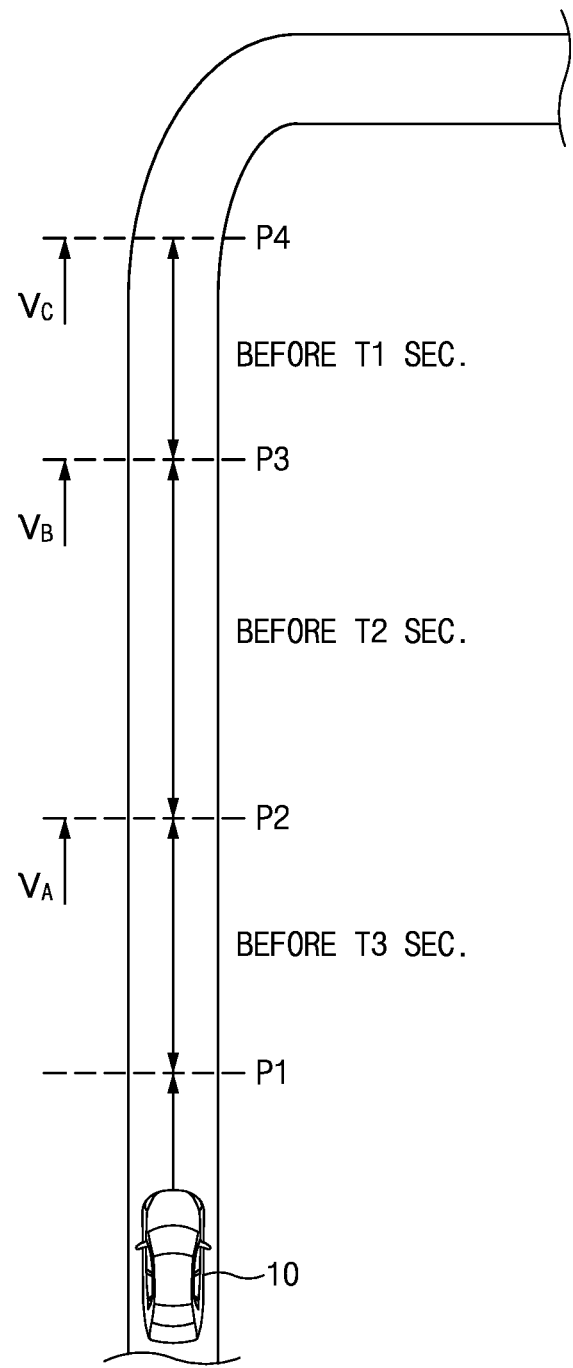
FIG. 3, FIG. 4, FIG. 5, FIG. 6, FIG. 7A, FIG. 7B, and FIG. 7C are views illustrating embodiments cited when describing an operation of an apparatus of controlling the transmission of a vehicle, according to various exemplary embodiments of the present invention.

Referring to FIG. 3, the first point 'P1' is a point in the first time (=T1+T2+T3 seconds) before the vehicle 10 arrives at the fourth point 'P4' provided as the start point of the curved road. For example, the first point 'P1' is a point in seven seconds before the vehicle 10 arrives at the fourth point 'P4'. The determining device 160 may determine whether the curved road in front satisfies the effective curved road condition when the vehicle 10 arrives at the first point 'P1'.

The second point 'P2' is a point in the second time (=T1+T2 seconds) before the vehicle 10 arrives at the fourth point 'P4' provided as the start point of the curved road. For example, the second point 'P2' is a point in five seconds before the vehicle 10 arrives at the fourth point 'P4'. The determining device 160 may determine whether the vehicle 10 satisfies an upshift prohibition condition when arriving at the second point 'P2'.

For example, the determining device 160 may determine that the vehicle 10 satisfies the upshift prohibition condition when the curved road in front satisfies the effective curved road condition, and when the vehicle 10 has the vehicle speed equal to or greater than a reference vehicle speed, for example, 10 kph when passing through the first point 'P1'. The determining device 160 may transmit the determination result to the control device 110.

Accordingly, the control device 110 may prevent the transmission from being controlled in accelerator OFF to prohibit upshift, when identifying that the upshift prohibition condition is satisfied by the determining device 160.

Referring to FIG. 3, the third point 'P3' is a point in the third time (=T1 seconds) before the vehicle 10 arrives at the fourth point 'P4' provided as the start point of the curved road. For example, the third point 'P3' is a point in second seconds before the vehicle 10 arrives at the fourth point 'P4'. In the instant case, the third point 'P3' may be an expected gearshifting point.

The determining device 160 may determine whether the vehicle 10 satisfies a gearshifting condition when arriving at the third point 'P3'.

For example, the determining device 160 may identify that the gearshifting condition is satisfied when the curved road in front satisfies the effective curved road condition when the vehicle 10 arrives at the third point 'P3'. The determining device 160 may transmit the determination result to the control device 110, the calculating device 170, or the pattern correcting device 180.

The control device 110 determines the correction (shift) of the gearshifting pattern, when identifying that the gearshifting condition is satisfied when the vehicle 10 arrives at the third point 'P3'. Accordingly, the control device 110 may transmit a control signal to bot the calculating device 170 and the pattern correcting device 180, to correct the gearshifting pattern.

The calculating device 170 may determine the speed (Vc) at the fourth point 'P4' provided as the start point for cornering on the curved road, by use of the speed ($V_B$) at the third point 'P3' provided as the expected gearshifting point, and the speed correcting coefficient 'H', as in following Equation 1. In other words, the calculating device 170 may determine the speed at the fourth point 'P4' through the correction based on the speed at the third point 'P3' and the speed correcting coefficient 'H'.

$$V_C = V_B * H \qquad \text{Equation 1}$$

In Equation 1, 'H' may denote the speed correcting coefficient, and 'H' may correspond to an average of values of 'H' corresponding to the level section based on the gradient.

In other words, the calculating device 170 may determine the speed correcting coefficient by accumulating the information on the vehicle speed for each gradient on the curved road during the driving of the vehicle. In detail, the calculating device 170 accumulates the speed (VB) at the third point 'P3' provided as the expected gearshifting point, and the speed ($V_c$) at the fourth point 'P4' provided as a starting point of the curved road, in a specific gradient-level section, and determines and accumulates the speed correcting coefficient which is a ratio for the differential value between the speed ($V_B$) at the third point 'P3' provided as the expected gearshifting point and the fourth point 'P4' provided as the start point of the curved road. As described above, the calculating device 170 may determine and accumulate the speed correcting coefficients with respect to each specific gradient-level sections, and may determine an average of the accumulated speed correcting coefficients, as a final speed correcting coefficient.

TABLE 1

| Gradient (LEVEL GROUP) | Speed correcting coefficient | Expected vehicle speed correcting equation |
| --- | --- | --- |
| −5% or less | $H_1$ | $V_C = V_B * H_1$ |
| −5% to 5% | $H_2$ | $V_C = V_B * H_2$ |
| 5% or more | $H_3$ | $V_C = V_B * H_3$ |

Table 1 illustrates a speed correcting coefficient and an expected vehicle speed correcting equation for each gradient.

For example, the final speed correcting coefficient, which is an average value of the speed correcting coefficients determined in a level section, which has the gradient of −5%, of the curved road, is $H_1$, the final speed correcting coefficient, which is an average value of the speed correcting coefficients determined in a level section, which has the gradient of −5% to 5%, of the curved road, is $H_2$, the final speed correcting coefficient, which is an average value of the speed correcting coefficients determined in a level section, which has the gradient of 5% or more, of the curved road, is H3. The speed correcting coefficients may be continuously learned corrected depending on the ratio for the differential value between the speed ($V_B$) at the third point 'P3' provided as the expected gearshifting point and the fourth point 'P4' provided as the start point of the curved road, which are obtained whenever the vehicle runs.

As described above, the speed correcting coefficients depending on the gradients of the curved road may be continuously determined and accumulated through a learning algorithm in advance. The calculating device 170 may determine the vehicle speed at the start point of the curved road by use of the final speed correcting coefficient determined as the average of the speed correcting coefficients accumulated depending on the gradients of the curved road, on which the vehicle currently runs.

In the instant case, the calculating device 170 may limit the range of the speed correcting coefficient to a specific range (e.g., the range of 0.7 to 1.2) to prevent the divergence of the learning value of the speed correcting coefficient. In other words, the calculating device 170 may increase the accuracy of the speed correcting coefficient except for the case that the speed at the expected gearshifting point and the speed at a point, at which the vehicle actually enters a corner (the vehicle is stopped in the middle point of the corner), represent a significantly large value.

As described above, according to various exemplary embodiments of the present invention, the vehicle speed may be obtained when the vehicle turns on the curved road, by reflecting the gradient of the curved road as well as the curvature of the curved road. The average value of the accumulated speed correcting coefficients based on vehicle speeds during the driving on the curved road is used to determine the vehicle speed at the start point on the curved road, reflecting the tendency of each driver in turning on the curved road, and thereafter varying a pattern movement by reflecting the tendency of the each driver.

Thereafter, the calculating device 170 determines the expected lateral acceleration based on the vehicle speed (Vc) at a time point at which the vehicle 10 passes through the fourth point 'P4' provided as the start point on the curved road, and the curvature of the curved road. In the instant case, the calculating device 170 may determine the expected lateral acceleration through following Equation 1.

$$G_{y\_predict} = k \times \frac{v^2}{R} \qquad \text{Equation 2}$$

In Equation 2, 'Gy_predict' refers to an expected lateral acceleration, 'V' refers to a vehicle speed at a time point at which the vehicle passes through the fourth point 'P4', 'R' refers to the curvature of the curved road, and 'k' refers to a specific coefficient. In the instant case, 'k' may be varied depending on the road and the vehicle condition.

As described above, the calculating device 170 may determine the expected lateral acceleration (Gy_predict) at the fourth point 'P4', based on the vehicle speed (VC), at which the vehicle passes through the fourth point 'P4', which is determined by considering the gradient of the curved road and the curvature of the curved road.

When the determination of the expected lateral acceleration is completed through Equation 2, the calculating device 170 determines the pattern correcting coefficient based on the determined expected lateral acceleration. In the instant case, the calculating device 170 may determine the pattern correcting coefficient by use of the expected lateral acceleration, which is determined above, and a lower limit reference value and an upper limit reference value of the lateral acceleration.

$$K = \frac{1}{B - A} \times (G_{y\_predict} - A) \qquad \text{Equation 3}$$

In Equation 3, 'K' refers to the pattern correcting coefficient, 'Gy_predict' refers to the expected lateral acceleration, 'A' refers to a lower limit reference value of the lateral acceleration, and 'B' refers to an upper limit reference value of the lateral acceleration. In the instant case, 'K' may be defined as a number which is equal to '0' or greater than '0'.

Figure 4:
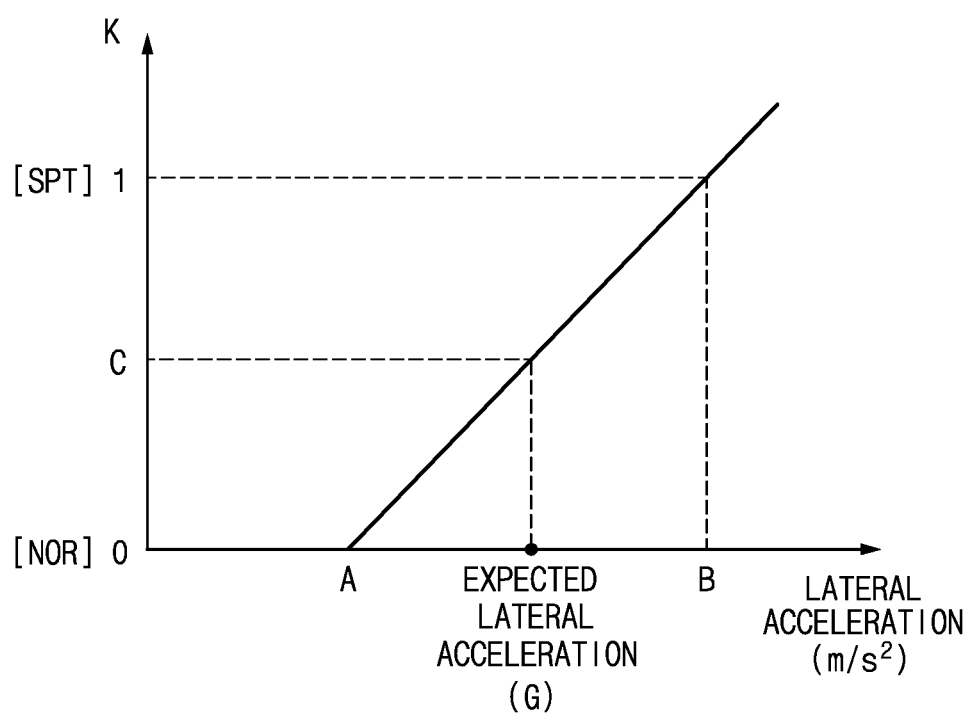

The pattern correcting coefficient depending on the expected lateral acceleration may be defined as illustrated in the graph of FIG. 4.

Referring to FIG. 4, the pattern correcting coefficient (K) becomes '0' when the expected lateral acceleration reaches the lower limit reference value (A). The gearshifting pattern may be determined as a normal pattern (NOR) in the state that the pattern correcting coefficient is zero (K=0).

Furthermore, the pattern correcting coefficient (K) becomes '1' when the expected lateral acceleration reaches the upper limit reference value (B). In the state that the pattern correcting coefficient is 1 (K=1), the gearshifting pattern may be determined as a sport pattern ($P_{SPT}$).

Meanwhile, the pattern correcting coefficient (K) becomes the value of 'C' (0<C<1) when the expected lateral acceleration is a value between the lower limit reference value and the upper limit reference value. In the instant case, the gearshifting pattern may be determined as a curved road pattern ($P_{CURVE}$).

Accordingly, the pattern correcting device 180 corrects (shifts) the gearshifting pattern based on the pattern correcting coefficient determined by the calculating device 170.

In the instant case, the pattern correcting device 180 may correct the gearshifting pattern through following Equation 4.

$$P_{CURVE} = P_{NOR} + (P_{ST} - P_{NOR}) \times K \quad \text{Equation 4}$$

An exemplary embodiment for correcting (moving) the gearshifting pattern will be described below with reference to FIG. 5.

Figure 5:
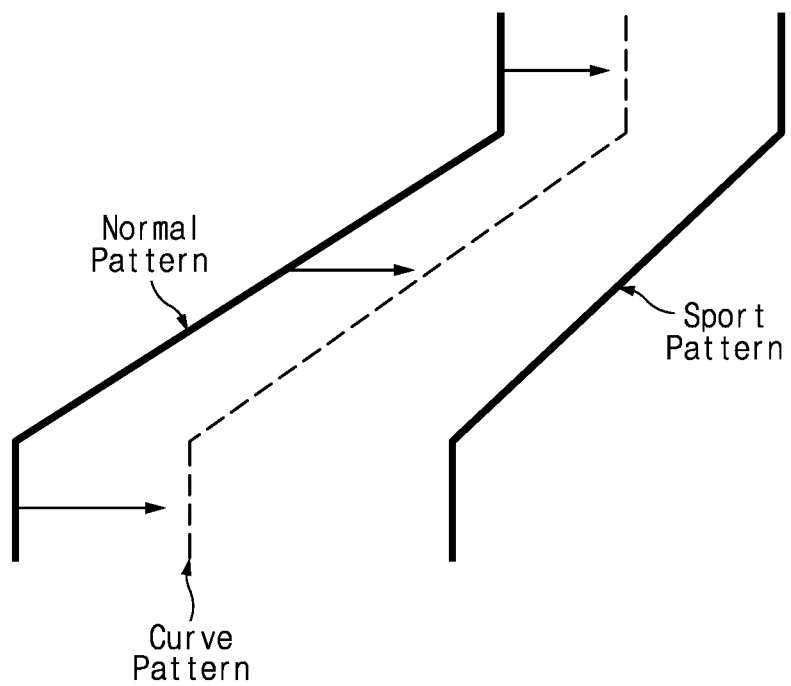

Referring to FIG. 5, on the assumption that a present gearshifting pattern is a normal pattern ($P_{NOR}$), the pattern correcting device 180 may move the pattern by '($P_{ST} - P_{NOR}) \times K$' based on the normal pattern ($P_{NOR}$).

Meanwhile, the fourth point 'P4' of FIG. 3 is a start point on the curved road. Accordingly, the control device 110 controls gear shifting based on the gearshifting pattern corrected (shifted) by the pattern correcting device 180, until the vehicle 10 passes through a curved road section when arriving at the fourth point 'P4'. For example, the control device 110 controls gear shifting based on the curve pattern ($P_{CURVE}$) as in illustrated FIG. 5, until the vehicle 10 passes through the curved road section.

Figure 6:
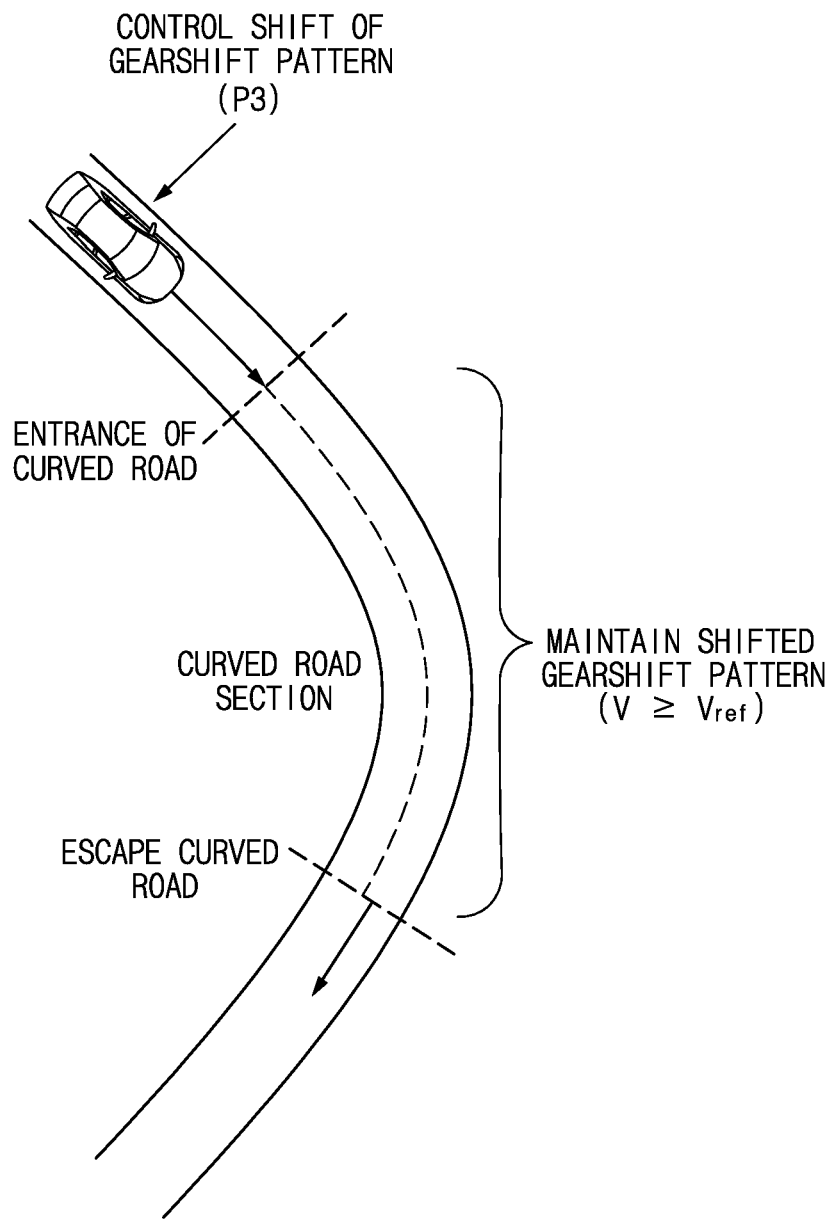

In the instant case, the determining device 160 may determine whether to satisfy a gear shifting condition while the vehicle 10 runs the curved road section. For example, the determining device 160 may determine whether to satisfy the gear shifting condition, depending on whether the vehicle speed is maintained to be greater than a reference vehicle speed while the vehicle 10 runs on the curved road section. In the instant case, the determining device 160 may determine that the gear shifting condition is not satisfied when the vehicle speed is less than the reference vehicle speed. Accordingly, the control device 110 controls gear shifting depending on the corrected gearshifting pattern while the vehicle 100 runs the curved road section as illustrated in embodiment of FIG. 6. When the gear shifting condition is not satisfied while the vehicle 10 runs on the curved road section, the control device 110 may return the gearshifting pattern to the normal pattern which is an existing gearshifting pattern.

Furthermore, the control device 110 may return the gearshifting pattern to the normal pattern which is the existing gearshifting pattern, when the vehicle 10 passes through the curved road section.

The determining device 160 may determine whether a continuous curved road section is present when the vehicle 10 passes through the curved road section. In the instant case, the control device 110 may return the gearshifting pattern to the normal pattern which is the existing gearshifting pattern, when it is determined that the continuous curved road section is not present.

Meanwhile, the control device 110 may maintain the corrected (shifted) gearshifting pattern, when it is determined that the continuous curved road section is present after the vehicle 10 passes through the curved road section.

In the instant case, the determining device 160 may determine whether the continuous curved road section is present, based on the distance to a next curved road section after the vehicle 10 passes through the curved road section, and the vehicle speed.

An exemplary embodiment for determining the continuous curved road section will be described below with reference to FIG. 7A, FIG. 7B, and FIG. 7C.

Figure 7A:
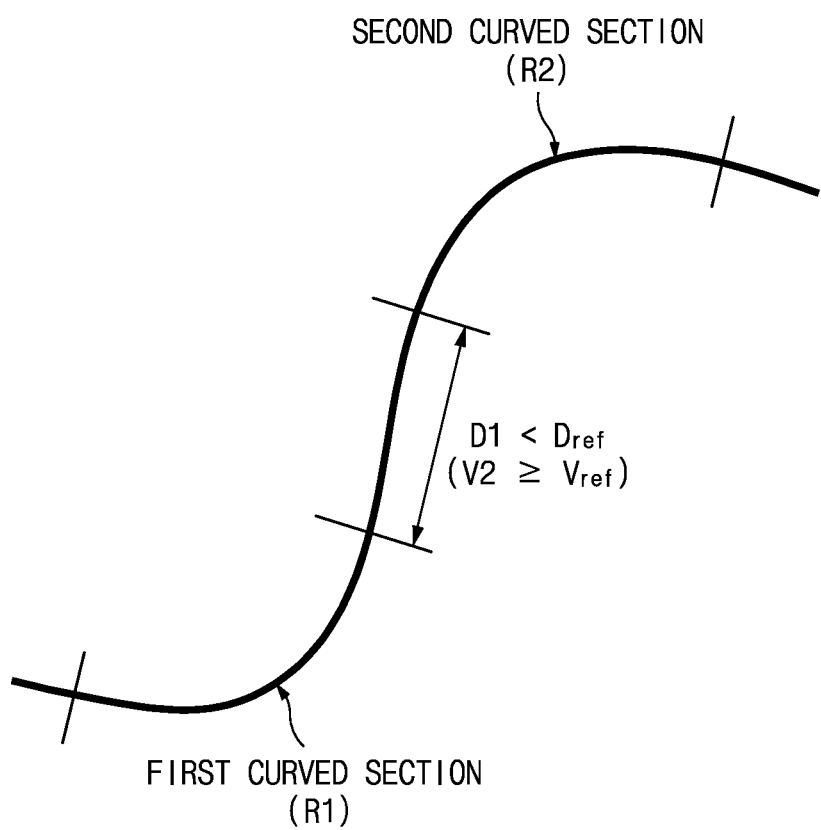

FIG. 7A illustrates an exemplary embodiment when a distance ($D_1$) between an end point of a first curved section ($R_1$) and a start point of a second curved section ($R_2$) is less than a reference distance ($D_{REF}$), and when a vehicle speed ($V_1$) is equal to or greater than the reference vehicle speed ($V_{ref}$)

In FIG. 7A, a distance condition and a speed condition are satisfied because the distance ($D_1$) between an end point of a first curved section ($R_1$) and the start point of a second curved section ($R_2$) is less than the reference distance ($D_{REF}$), and when the vehicle speed ($V_1$) is equal to or greater than the reference vehicle speed ($V_{ref}$)

Accordingly, the determining device 160 may determine the second curved section as a continuous curved road section. Accordingly, the controller 110 continuously maintains the corrected gearshifting pattern even after the vehicle passes through the first curved section ($R_1$) depending on the determination result of the determining device 160.

Figure 7B:
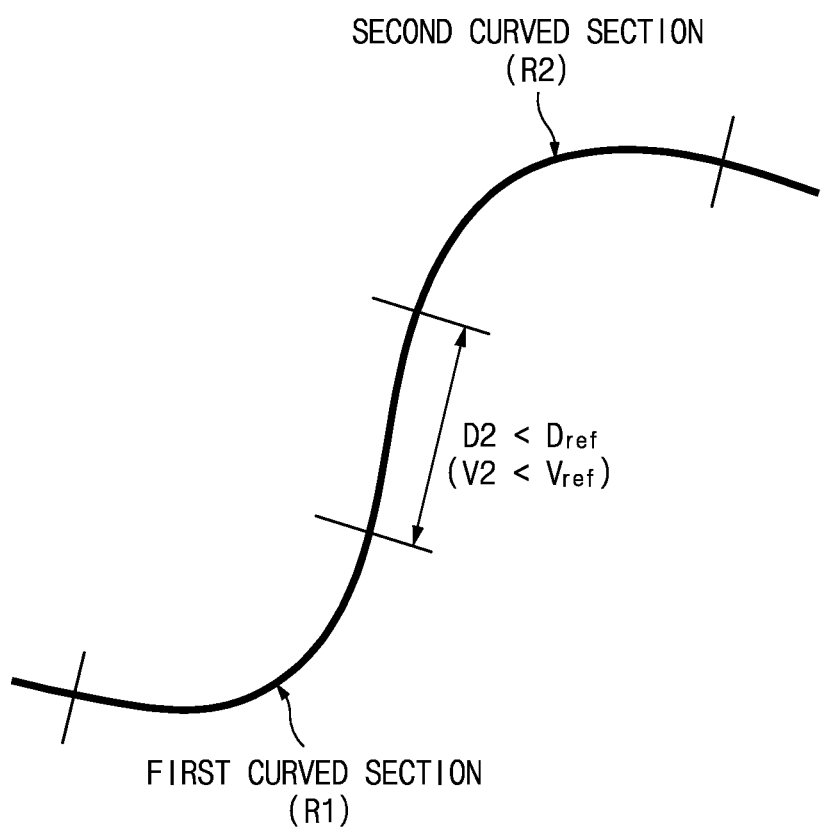

FIG. 7B illustrates an exemplary embodiment when a distance ($D_2$) between an end point of a first curved section ($R_1$) and a start point of a second curved section ($R_2$) is less than a reference distance ($D_{REF}$), and when a vehicle speed ($V_2$) is less than the reference vehicle speed ($V_{ref}$)

In FIG. 7B, the determining device 160 determines that a distance condition is satisfied because the distance ($D_2$) between the end point of a first curved section ($R_1$) and the start point of a second curved section ($R_2$) is less than the reference distance ($D_{REF}$), but does not determine that a speed condition is satisfied because the vehicle speed ($V_2$) is less than the reference vehicle speed ($V_{ref}$).

Accordingly, the determining device 160 may determine that the second curved section is not the continuous curved road section. Accordingly, the control device 110 may return the corrected gearshifting pattern to the existing normal pattern after the vehicle pass through the first curved section ($R_1$) depending on the determination result of the determining device 160.

Figure 7C:
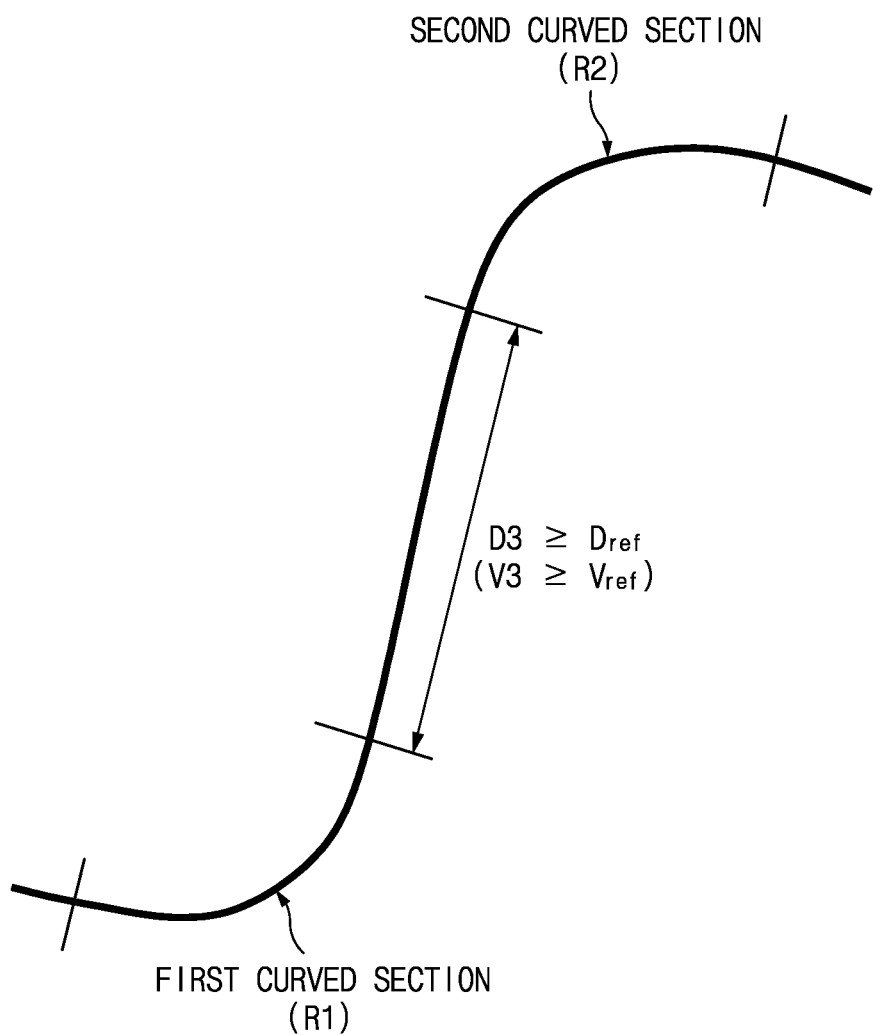

FIG. 7C illustrates an exemplary embodiment when a distance ($D_3$) between an end point of a first curved section ($R_1$) and a start point of a second curved section ($R_2$) is equal to or greater than a reference distance ($D_{REF}$), and when a vehicle speed ($V_3$) is equal to or greater than the reference vehicle speed ($V_{ref}$)

In FIG. 7C, the determining device 160 determines that the speed condition is satisfied because the vehicle speed ($V_3$) is equal to or greater than the reference vehicle speed ($V_{ref}$), but does not determine that the distance condition is satisfied because the distance ($D_3$) between the end point of a first curved section ($R_1$) and the start point of a second curved section ($R_2$) is equal to or greater than the reference distance ($D_{REF}$).

Accordingly, the determining device 160 may determine that the second curved section is not the continuous curved road section. Accordingly, the control device 100 may return the corrected gearshifting pattern to the existing normal pattern after the vehicle passes through the first curved section ($R_1$).

As described above, according to various exemplary embodiments of the present invention, the apparatus 100 for controlling the transmission may determine the gearshifting pattern depending on the road condition in front and the state of the vehicle 10, when the vehicle enters a curved road or after the vehicle passes the curved road, preventing excessive upshift when driving on the curved road such that the driving satisfaction of a driver is improved.

According to the exemplary embodiment of the present invention, the apparatus 100 for controlling the transmission of the vehicle having the above operation may be implemented in a form of an independent hardware device including a memory and a processor to process each operation, and may be run in the form included in another hardware device such as a microprocessor or a general purpose computer system.

The flowchart of the operation of the apparatus 100 for controlling the transmission of the vehicle will be described below according to various exemplary embodiments of the present invention.

Figure 8:
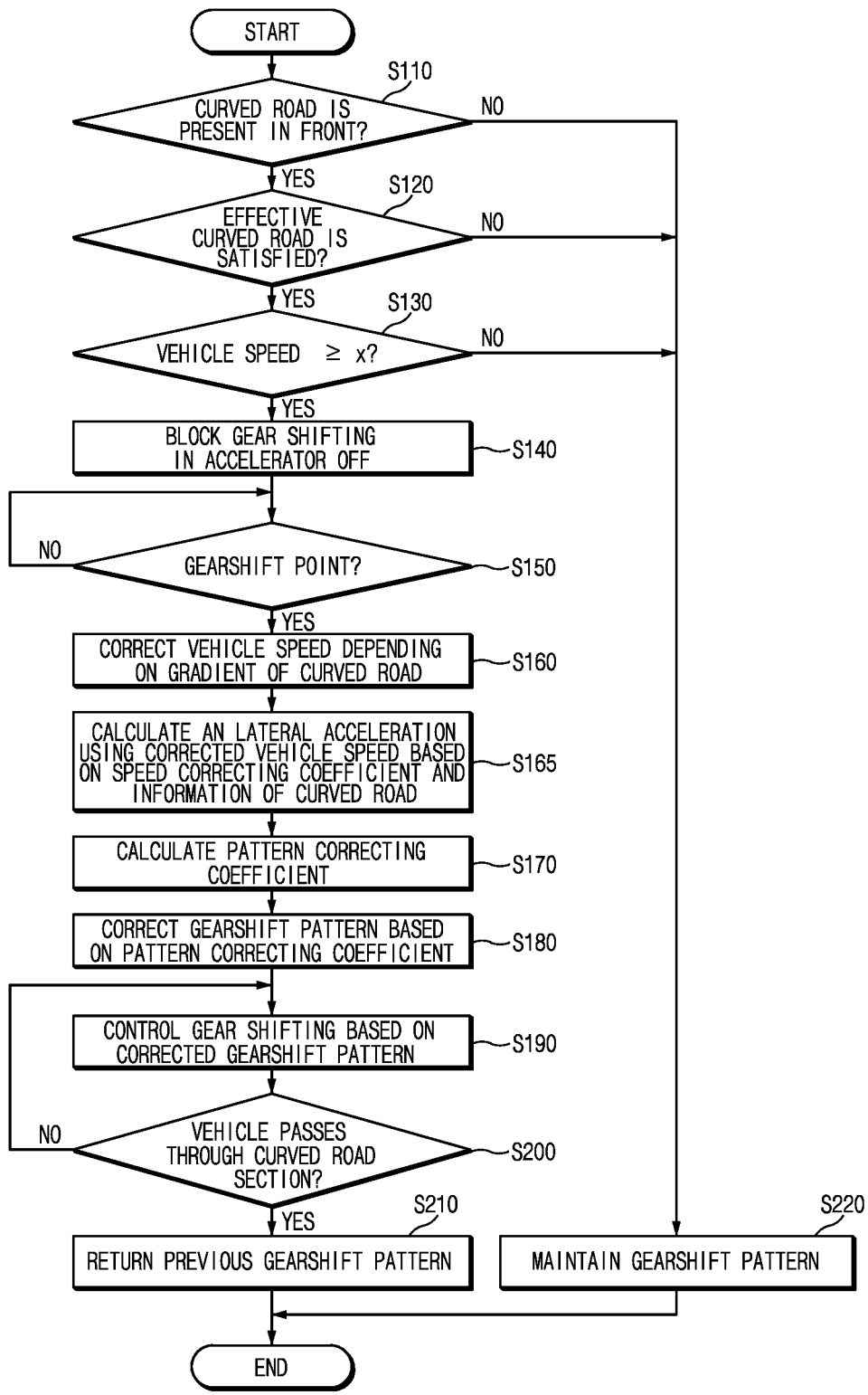
FIG. 8 and FIG. 9 are views illustrating flowcharts of the operations of a method for controlling a transmission of a vehicle, according to various exemplary embodiments of the present invention.
Figure 9:
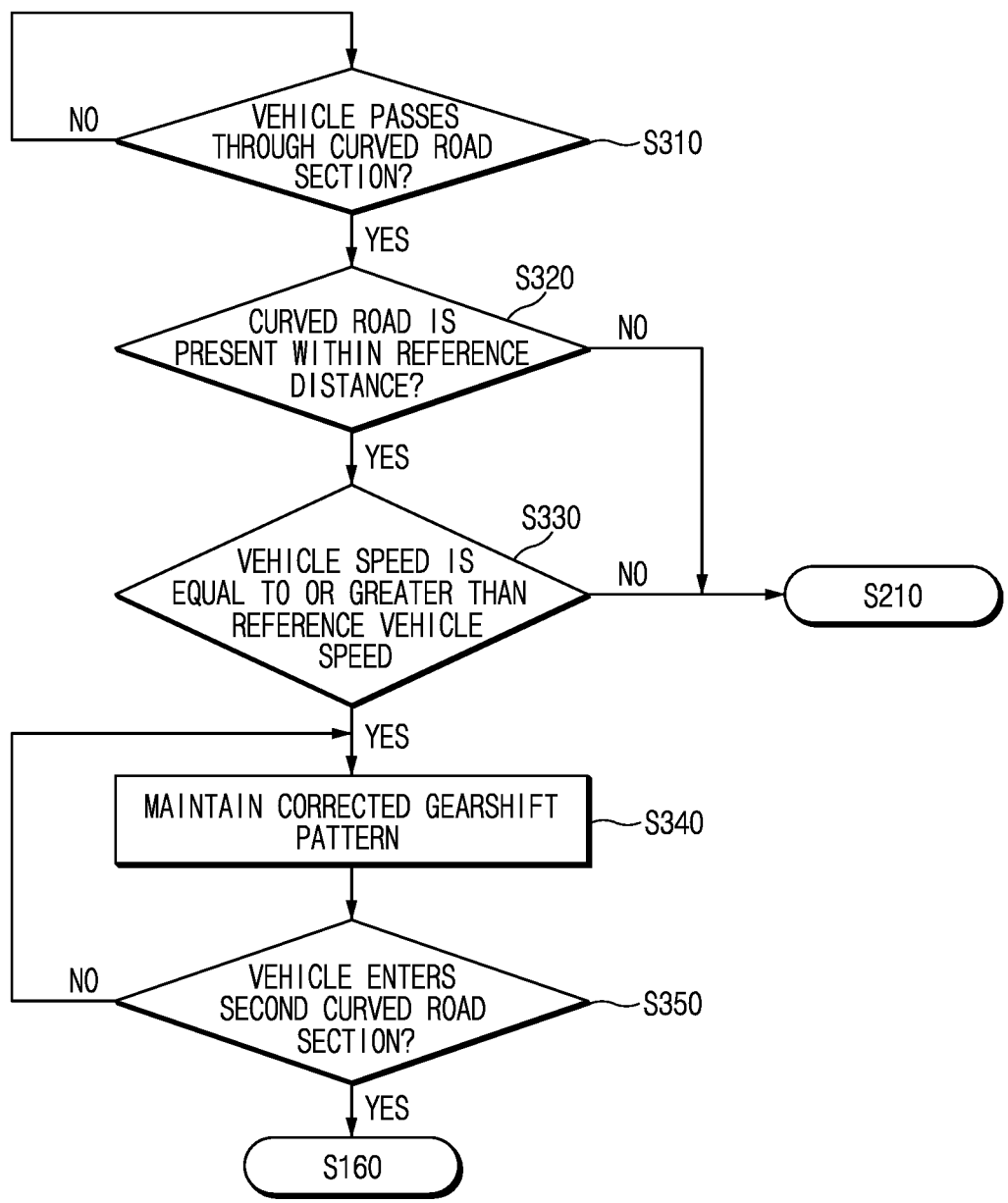

FIG. 8 and FIG. 9 are views illustrating flowcharts of the operations of a method for controlling a transmission of a vehicle, according to various exemplary embodiments of the present invention.

Referring to FIG. 8, the apparatus 100 for controlling the transmission of the vehicle determines whether a curved road is present within a specific distance in front of the vehicle, based on information on a front road, which is obtained from the navigation system 15 or sensors (S110) and determines whether the relevant curved road satisfies the effective curved road (S120). In the instant case, the apparatus 100 for controlling the transmission of the vehicle may perform S120 when the vehicle 10 arrives at the first point of FIG. 3.

The apparatus 100 for controlling the transmission of the vehicle blocks gear shifting in the accelerator OFF to prevent upshift from occurring in the accelerator OFF (S140), when a present vehicle speed of the vehicle 10 is equal to or greater than a reference vehicle speed (x), when it is determined that the relevant curved road satisfies the effective cured road condition in S120. In the instant case, the apparatus 100 for controlling the transmission of the vehicle may perform S130 and S140 when the vehicle 10 arrives at the second point of FIG. 3.

When arriving at the expected gearshifting point, that is, the third point of FIG. 3 in S150, the apparatus 100 for controlling the transmission of the vehicle corrects a vehicle speed at a start point of the curved road based on the speed correcting coefficient 'H' which is learned depending on the gradient of the curved road (S160), determines an expected lateral acceleration based on the corrected vehicle speed and the curvature of the curved road (S165), and determines the pattern correcting coefficient, which is based on the expected lateral acceleration in S160, (S170). In the instant case, the apparatus 100 for controlling the transmission of the vehicle may correct (shift) the gearshifting pattern based on the pattern correcting coefficient, which is determined in S170, (S180).

In the instant case, the apparatus 100 for controlling the transmission of the vehicle controls the gear shifting based on the corrected (shifted) gearshifting pattern in S180 (S190). In the instant case, the apparatus 100 for controlling the transmission of the vehicle may maintain the corrected gearshifting pattern until the vehicle 10 passes through the curved section and may control the gear shifting.

When the vehicle 10 passes through the curved road section in S200, the apparatus 100 for controlling the transmission of the vehicle returns the corrected gearshifting pattern to the previous gearshifting pattern (S210)

Meanwhile, the apparatus 100 for controlling the transmission of the vehicle maintains the reference gearshifting pattern and control the gear shifting when the front curved road fails to satisfy the effective curved road condition or when the vehicle speed is less than the reference vehicle speed (S220).

Meanwhile, the apparatus 100 for controlling the transmission of the vehicle does not return to the previous gearshifting pattern immediately after determining that the vehicle pass through the curved road section in S200. In other words, the apparatus 100 for controlling the transmission of the vehicle may return to the previous gearshifting pattern depending on a determination result after determining whether the continuous curved road is present.

Referring to FIG. 9, the apparatus 100 for controlling the transmission of the vehicle determines whether a next curved road is present on the front road within the reference distance (S320), when the vehicle 10 passes through the curved road section in S310. When the curved road is not present within the reference distance in S320, the apparatus 100 for controlling the transmission of the vehicle does not determine that the curved road is continuously present, to return to the previous gearshifting pattern in S210.

The apparatus 100 for controlling the transmission of the vehicle determines whether the vehicle speed is equal to or greater than a reference vehicle speed (S330), when determining that the next curved road is present on the front road within the reference distance in S320. When the vehicle speed is less than the reference vehicle speed in S330, the apparatus 100 for controlling the transmission of the vehicle does not determine that the curved road is continuously present, to return to the present gearshifting pattern in S210.

Meanwhile, the apparatus 100 for controlling the transmission of the vehicle maintains the corrected gearshifting pattern until the vehicle enters the second curved road when determining that the curved road is present within the reference distance in S320, and when the vehicle speed is equal to or greater than the reference vehicle speed in S330 (S340).

The apparatus 100 for controlling the transmission of the vehicle may perform operations after S160 of FIG. 8 when the vehicle enters the second curved road section in S350.

As described above, according to the present disclosure, the vehicle speed is expected based on the gradient and the curvature of the curved road when the vehicle performs cornering on the curved road having both the gradient and the corner, and the lateral acceleration is determined based on the expected acceleration, controlling the transmission.

Figure 10:
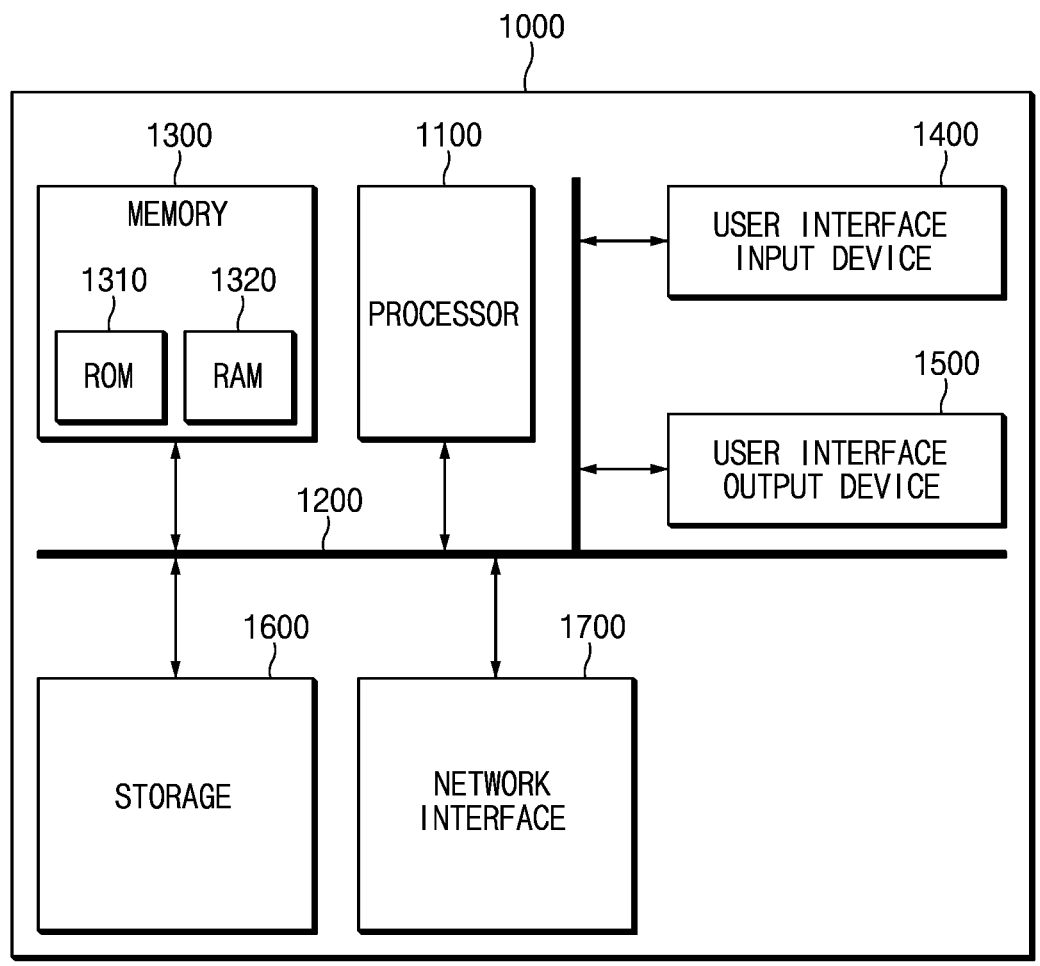
FIG. 10 is a view exemplarily illustrating a determining system to execute a method, according to various exemplary embodiments of the present invention.

FIG. 10 is a view exemplarily illustrating a computing system to execute a method, according to various exemplary embodiments of the present invention.

Referring to FIG. 10, a computing system 1000 may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device configured for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the exemplary embodiments included in various exemplary embodiments of the present invention may be directly implemented with a hardware module, a software module, or the combinations thereof, executed by the processor 1100. The software module may reside on a storage medium (i.e., the memory 1300 or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to various exemplary embodiments of the present invention, the gearshifting pattern is corrected depending on the expected lateral acceleration based on the vehicle speed, the curvature of the curved road, and the gradient of the curved road when the curved road is present in front of the vehicle, not only stably performing driving on the curved road, but also improving the engine brake effect and the re-acceleration response.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of controlling a transmission of a vehicle, the apparatus comprising:
   a determining device configured to determine whether a curved road is present within a predetermined distance in front of the vehicle, according to information on a front road;
   a calculating device configured to correct, according to information on a gradient of the curved road, a vehicle speed in starting cornering of the vehicle on the curved road, to determine an expected lateral acceleration of the vehicle according to the corrected vehicle speed and information on a curvature of the curved road, and to determine a pattern correcting coefficient according to the determined expected lateral acceleration;
   a pattern correcting device configured to correct a gearshifting pattern of the transmission, which is preset, according to the pattern correcting coefficient; and
   a control device connected to the determining device, the calculating device and the pattern correcting device and configured to control the transmission according to the corrected gearshifting pattern when the vehicle enters the curved road.

2. The apparatus of claim 1, wherein the determining device is configured to determine whether the curved road satisfies an effective curved road condition, according to a distance of a section of the curved road and the information on the curvature of the curved road.

3. The apparatus of claim 2, wherein the determining device is configured to determine whether the vehicle arrives at an expected gearshifting point before the vehicle arrives at a start point of the curved road, when the curved road satisfies the effective curved road condition.

4. The apparatus of claim 3, wherein the expected gearshifting point is positioned in a predetermined time before the vehicle arrives at the start point of the curved road.

5. The apparatus of claim 1, wherein the determining device is configured to determine a speed correcting coefficient learned depending on an extent of the gradient of the curved road.

6. The apparatus of claim 5, wherein the determining device is configured to determine a speed of the vehicle at a start point of the curved road according to the vehicle speed and the speed correcting coefficient at an expected gearshifting point, when the vehicle arrives at the expected gearshifting point.

7. The apparatus of claim 6, wherein the calculating device is configured to determine the expected lateral acceleration of the vehicle according to the speed of the vehicle at the start point of the curved road and the curvature of the curved road.

8. The apparatus of claim 1, wherein the calculating device is configured to determine the pattern correcting coefficient according to a differential value between the determined expected lateral acceleration and a lower limit reference value of a lateral acceleration, and a differential value between the lower limit reference value of the lateral acceleration and an upper limit reference value of the lateral acceleration.

9. The apparatus of claim 1, wherein the pattern correcting coefficient is defined as a value in '0' and '1'.

10. The apparatus of claim 9, wherein the gearshifting pattern is:
    determined as a first gearshifting pattern according to a normal mode when the pattern correcting coefficient is '0';
    determined as a second gearshifting pattern according to a sport mode when the pattern correcting coefficient is '1'; and
    determined as a third gearshifting pattern according to the curved road when the pattern correcting coefficient is greater than '0' and less than '1'.

11. The apparatus of claim 10, wherein the pattern correcting device is configured to change, according to the first gearshifting pattern, the gearshifting pattern by a value, which is obtained by multiplying a differential value between the second gearshifting pattern and the first gearshifting pattern by the pattern correcting coefficient, when the gearshifting pattern is determined as being the third gearshifting pattern.

12. The apparatus of claim 1, wherein the control device is configured to return the corrected gearshifting pattern to a previous gearshifting pattern, when the vehicle passes through the curved road.

13. The apparatus of claim 1, wherein the determining device is configured to determine whether a continuous curved road is present on the front road, when the vehicle passes through the curved road.

14. The apparatus of claim 13, wherein the determining device is configured to determine the continuous curved road as being present on the front road, when a next curved road is present on the front road within a reference distance after the vehicle passes through the curved road, and when the vehicle speed of the vehicle is equal to or greater than a reference vehicle speed.

15. The apparatus of claim 14, wherein the control device is configured to maintain the corrected gearshifting pattern when the continuous curved road is determined as being present on the front road.

16. The apparatus of claim 14, wherein the control device is configured to return the corrected gearshifting pattern to a previous gearshifting pattern when the continuous curved road is determined as being absent on the front road.

17. A method of controlling a transmission of a vehicle, the method comprising:
   determining whether a curved road is present within a predetermined distance in front of the vehicle, according to information on a front road;
   determining a vehicle speed in starting cornering of the vehicle on the curved road, according to information on a gradient of the curved road;
   determining an expected lateral acceleration of the vehicle according to the vehicle speed and information on a curvature of the curved road to determine a pattern correcting coefficient according to the determined expected lateral acceleration;
   correcting a gearshifting pattern of the transmission, which is preset, according to the pattern correcting coefficient; and
   controlling, by a control device, the transmission according to the corrected gearshifting pattern when the vehicle enters the curved road.

18. The method of claim 17, wherein the determining of whether the curved road is present includes:
   determining whether the curved road satisifes an effective curved road condition, according to a distance of a section of the curved road and informatioin on the curvature of the curved road; and
   determining whether the vehicle arrives at an expected gearshifting point before the vehicle arrives at a start point of the curved road, when the curved road satisfies the effective curved road condition.

19. The method of claim 18, wherein the determining of the expected lateral acceleration includes:
   determining a speed correcting coefficient learned depending on the gradient of the curved road; and
   determining a speed of the vehicle at the start point of the curved road according to a vehicle speed at the expected gearshifting point and the speed correcting coefficient, when the vehicle arrives at the expected gearshifting point before the vehicle arrives at the start point of the curved road.

20. The method of claim 19, wherein the determining of the expected lateral acceleration further includes:
   determining the expected lateral acceleration of the vehicle according to the speed of the vehicle at the start point of the curved road and the curvature of the curved road.

* * * * *